United States Patent [19]
Dewitt et al.

[11] Patent Number: 5,732,265
[45] Date of Patent: Mar. 24, 1998

[54] STORAGE OPTIMIZING ENCODER AND METHOD

[75] Inventors: Frederick J. Dewitt, Kirkland; Thomas D. McGuire, Bellevue, both of Wash.

[73] Assignee: Microsoft Corporation, Redmond, Wash.

[21] Appl. No.: 552,225

[22] Filed: Nov. 2, 1995

[51] Int. Cl.$^6$ .................................................. G06F 17/30
[52] U.S. Cl. ......................... 395/616; 395/602; 395/615
[58] Field of Search ................................. 395/601, 602, 395/616, 620, 615

[56] References Cited

U.S. PATENT DOCUMENTS

| | | | |
|---|---|---|---|
| 4,709,367 | 11/1987 | Grafe et al. | 371/40.14 |
| 5,050,212 | 9/1991 | Dyson | 380/25 |
| 5,129,082 | 7/1992 | Tirfing et al. | 395/603 |
| 5,202,952 | 4/1993 | Gramlich et al. | 395/602 |
| 5,410,667 | 4/1995 | Belsan et al. | 395/441 |
| 5,454,000 | 9/1995 | Dorfman | 371/53 |
| 5,479,654 | 12/1995 | Squibb | 395/617 |
| 5,497,486 | 3/1996 | Stolfo et al. | 395/607 |
| 5,559,991 | 9/1996 | Kanfi | 395/489 |
| 5,586,322 | 12/1996 | Beck et al. | 395/616 |
| 5,649,196 | 7/1997 | Woodhill et al. | 395/620 |

*Primary Examiner*—Paul R. Lintz
*Attorney, Agent, or Firm*—Klarquist Sparkman Campbell Leigh & Whinston, LLP

[57] ABSTRACT

An encoder and method, such as for use in CD-ROM pre-mastering software, optimizes storage on a computer readable recording medium by eliminating redundant storage of identical data streams for duplicate files. The encoder and method detect whether two files have equivalent data streams, and encodes such duplicate files as a single data stream referenced by the respective directory entries of the files. In the illustrated embodiment, the encoder and method detect duplicate files based on file size and a cyclic redundancy check calculated on the file's data stream or portion thereof.

31 Claims, 6 Drawing Sheets

STORAGE OPTIMIZING ENCODER AND METHOD

FIELD OF THE INVENTION

This invention relates generally to encoding data so as to optimize storage thereof on a computer readable recording medium, and more particularly relates to an encoder and method for optimizing data storage by removing duplicate files on a computer readable recording medium.

BACKGROUND AND SUMMARY OF THE INVENTION

Data is typically encoded onto a computer readable recording medium (e.g., hard disk, floppy disk, compact read-only optical disk ("CD-ROM"), or magnetic tape) as multiple data streams (i.e., sequentially ordered data) which are accessed as files in a hierarchical directory structure. For example, CD-ROM software products commonly use a CD-ROM data volume encoding format specified in the International Standard ISO-9660:1988(E), "Information processing—Volume and file structure of CD-ROM for information interchange" (hereafter "ISO-9660"). ISO-9660 specifies a familiar hierarchical directory structure in which data is organized as files. Each directory in the structure stores "entries" for a set of files in that directory. Each entry contains information including a filename, a starting sector number, and a length, which identifies or "points" to a corresponding data stream on the CD-ROM that is the file's "contents."

In a typical ISO-9660 compliant CD-ROM volume, each individual file's directory entry points to a unique data stream or sequence of sectors in the volume (i.e., there is a one-to-one relationship of the files' directory entries to data streams in the volume). If two identical files are encoded in the volume, each file's contents or data stream is separately encoded in the volume. Further, each of the two files' directory entries contains a unique starting sector number that "points" to the file's separate stream of data.

Some prior operating systems provide a service for a user to manually create "links" to an existing file in a data volume. Windows NT, for example, provides a service for manually creating links in a Windows NT file system ("NTFS") volume. The links are entries in other directories of the hierarchical directory structure which each point to a same data stream of the existing file. The multiple directory entries of the "links" therefore have a many-to-one relationship to the stored data stream. This allows the computer user to effectively store identical files in multiple directories, yet consume only the space of a single data stream on the physical recording medium for the "contents" of the files. Files that are stored in this manner are sometimes referred to as being "cross-linked." These prior "create link" services have the drawback that the links must be individually and manually created by the user.

Many current CD-ROM products contain a large number of files in different locations of the directory structure that have duplicate contents. In the CD-ROM for Microsoft Corporation's Windows NT operating system product (hereafter "Windows NT") for example, a file named "NTC-MDS.HLP" is encoded in four different directories, viz. in the "\I386," "\mips," "\ppc," and "\alpha" directories, that are associated with various computer hardware platforms on which Windows NT can be installed. Since ".HLP" files for Windows NT don't vary from platform to platform, the contents of the four NTCMDS.HLP files are identical. Although their contents are identical, these files are encoded on the CD-ROM volume as four unique files with four separate yet identical streams of data. Further, there is currently a trend for software products to increasingly incorporate reusable software components, such as dynamic link library files, etc. in application programs, which may lead to an increased number of duplicate files on CD-ROM products containing multiple application programs.

When data for a software product is encoded onto a data volume for mass duplication such as on CD-ROMs (a process sometimes referred to as "pre-mastering"), the data preferably is encoded so as to minimize the physical space that is required to store the data on the recording medium. As a result, it may be possible to fit the data for the software product on fewer disks, and thereby reduce production costs. By optimizing storage in the pre-mastering process, it also may be possible to store additional data on the same number of disks, and thereby add value to the software product.

The present invention optimizes data storage by detecting duplicate files (i.e., those having identical contents) and encoding them on a computer readable recording medium as a single data stream with multiple directory entries pointing to that data stream. For data volumes having duplicate files, this reduces the required storage of the volume by eliminating separate storage of identical data streams for each of the duplicate files' directory entries.

Further, for recording media which is read only, the data volume encoded by the invention generally remains compatible with the same file systems that are used on data volumes in which duplicate files are encoded as separate data streams. In general, the file system reads a file by retrieving data from the data stream pointed to by the file's directory entry. In data volumes encoded by the invention, the directory entries of duplicate files point to the same data stream. This does not affect the file system's reading of duplicate files. The file system still reads one of the duplicate files by following the pointer in its directory entry to the shared data stream in the same manner as when reading any other file having a unique data stream encoded in the data volume. The only difference to an operating system or application program is that the sum of the file sizes in the directory entries of the data volume encoded by the invention is larger than the total size of the data volume. A disk check utility also may detect that the duplicate files are "cross-linked" on the data volume encoded by the invention.

When multiple files are encoded as a single data stream on a read/write recording medium, data consistency problems can result when the files are separately modified by an operating system or application program. To avoid problems with data consistency, embodiments of the invention which encode data volumes on read/write recording media can be used in conjunction with a file system that tracks duplicate files which are encoded as a single data stream and "forks" or writes such files when modified into a unique data stream separate from that shared by any remaining unmodified duplicate files.

As discussed above, cross-linked files can be created using create link services of UNIX or NTFS. With UNIX and NTFS, the process of creating multiple directory entries for a single data stream is a manual process. In general, the process used in UNIX and NTFS to create cross-linked files begins with a single file encoded as a unique data stream. The user then manually adds additional links or directory entries with the create link service which point to the same data stream as the original file's directory entry.

By contrast, the process and encoder according to the invention operates on data comprising a plurality of files with corresponding original data streams, some of which may be identical. The process and encoder of the invention detects that two or more of the original data streams are identical and optimizes the storage requirement on a recording medium by encoding the duplicate files on a data volume as multiple directory entries pointing to a single data stream.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

Figure 1:
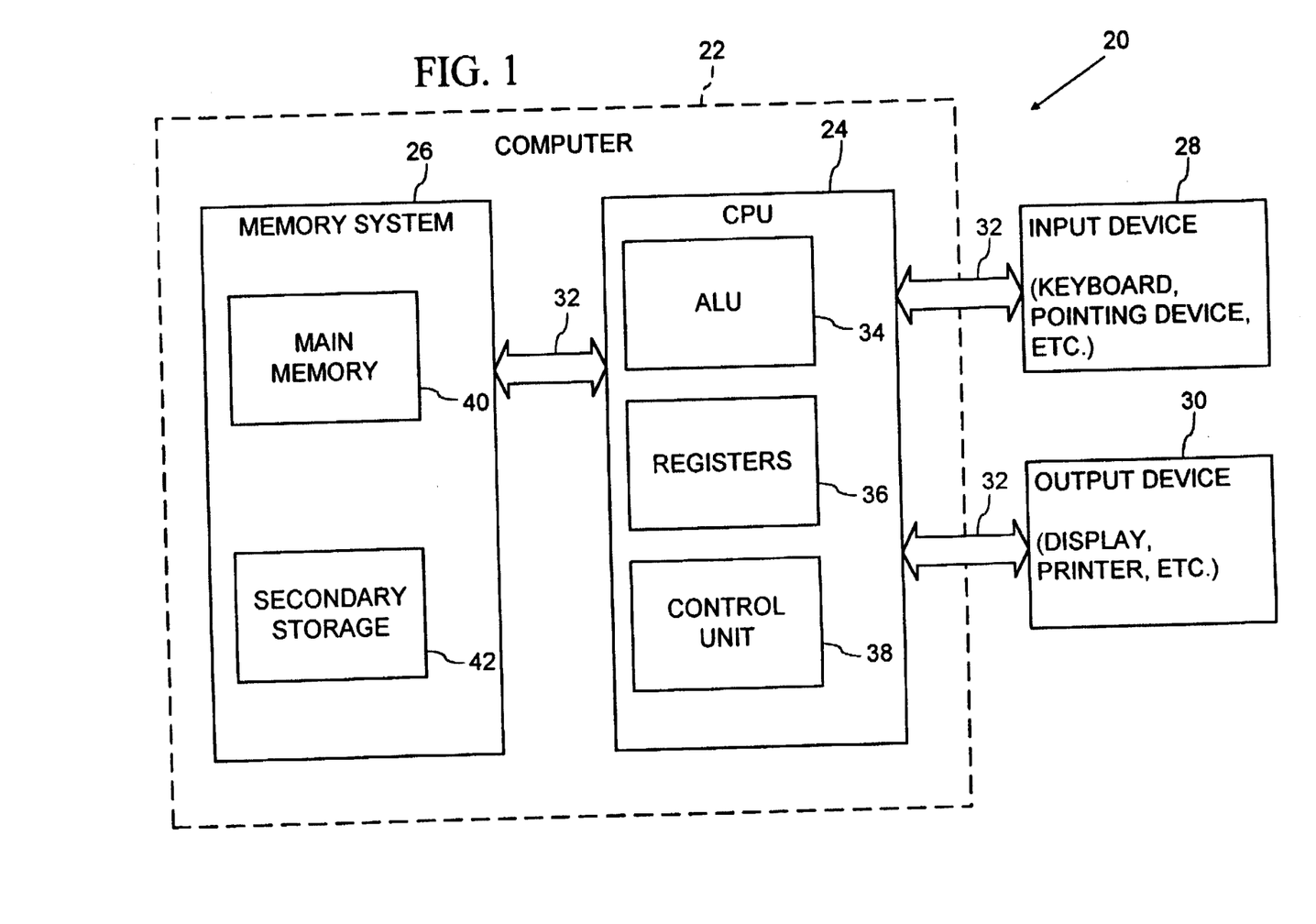
FIG. 1 is a block diagram of a computer system that may be used to implement a method and apparatus embodying the invention.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g. a microphone), etc. The output device 30 can comprise a display, a printer, a transducer (e.g. a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to symbolic representations of operations that are performed by the computer system 20. Such operations are sometimes referred to as being computer-executed. It will be appreciated that the operations which are symbolically represented include the manipulation by the CPU 24 of electrical signals representing data bits and the maintenance of data bits at memory locations in the memory system 26, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The computer-readable medium can be any of the devices, or a combination of the devices, described above in connection with the memory system 26.

Figure 2:
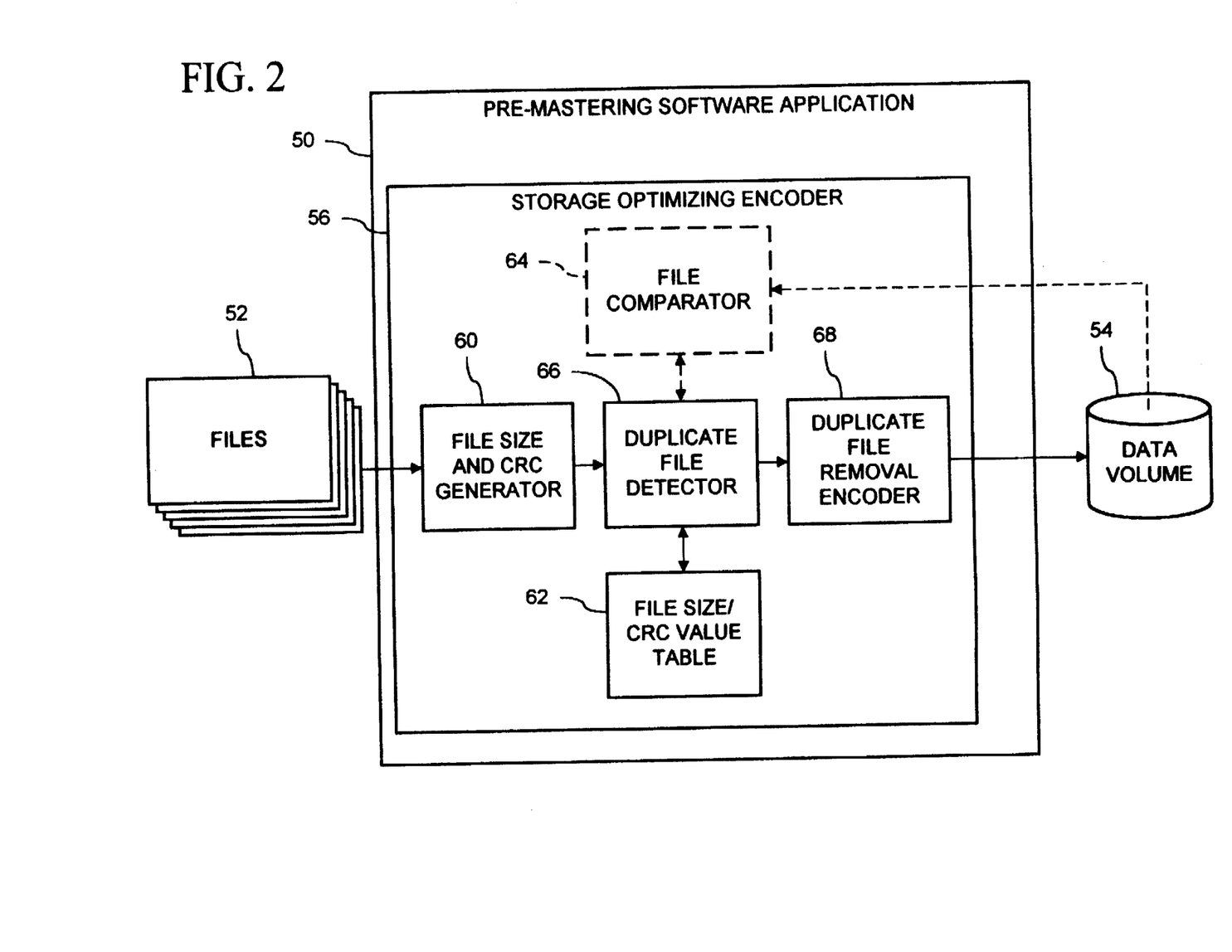
FIG. 2 is a block diagram of a storage optimizing CD-ROM pre-mastering encoder according to an illustrated embodiment of the invention.

Referring now to FIG. 2, the illustrated embodiments of the invention for encoding data to optimize storage on a computer readable recording media are implemented in a pre-mastering software application 50 which can be run on the computer system 20 (FIG. 1). The pre-mastering software application 50 encodes a plurality of files 52 into a data volume 54 to optimize storage of the data volume on a computer readable recording medium. In the illustrated embodiments, the pre-mastering software application 50 encodes the files 52 on the data volume 54 to be compatible with the ISO-9660 specification for CD-ROMs. After pre-mastering by the application 50, the data volume 54 can be recorded using known mass production techniques on CD-ROMs for sale or distribution in mass market software products. For such mass reproduction of the data volume 54 on CD-ROM, the computer system 20 (FIG. 1) may be directly connected to a CD-ROM printing device or alternatively record or communicate the data volume 54 for transfer to a CD-ROM printing or reproducing device. Alternative embodiments of the invention can be implemented in pre-mastering software applications for other types of computer readable recording media, including for example magnetic recording media such as floppy disks and tape, optical recording media, semiconductor recording media such as read-only memory ("ROM") chips, magneto-optical recording media, and others.

The pre-mastering software application 50 includes a storage optimizing encoder 56 which optimizes storage of the data volume 54 on a CD-ROM by detecting files with identical contents ("duplicate files"), and encoding the duplicate files in the data volume as a single data stream referenced by multiple directory entries in a directory structure of the data volume 54. For detecting duplicate files, the storage optimizing encoder 56 of the illustrated embodiments includes a file size and cyclic redundancy check ("CRC") generator 60, a file size/CRC table 62, a file comparator 64, and a duplicate file detector 66. In one illustrated embodiment (described below as using the "fast" duplicate file detection process), the file comparator 64 can be omitted. The storage optimizing encoder 56 further includes a duplicate file removing encoder 68 to encode the files 54 according to the result of the duplicate file detection, i.e. as multiple directory entries pointing to a same data stream for duplicate files, or a directory entry pointing to a unique data stream for non-duplicate files. Each of the component blocks 56, 60, 62, 64, 66, and 68 of the pre-mastering software application 50 is typically implemented as a module of code including a set of related functions and associated data variables.

Figure 3:
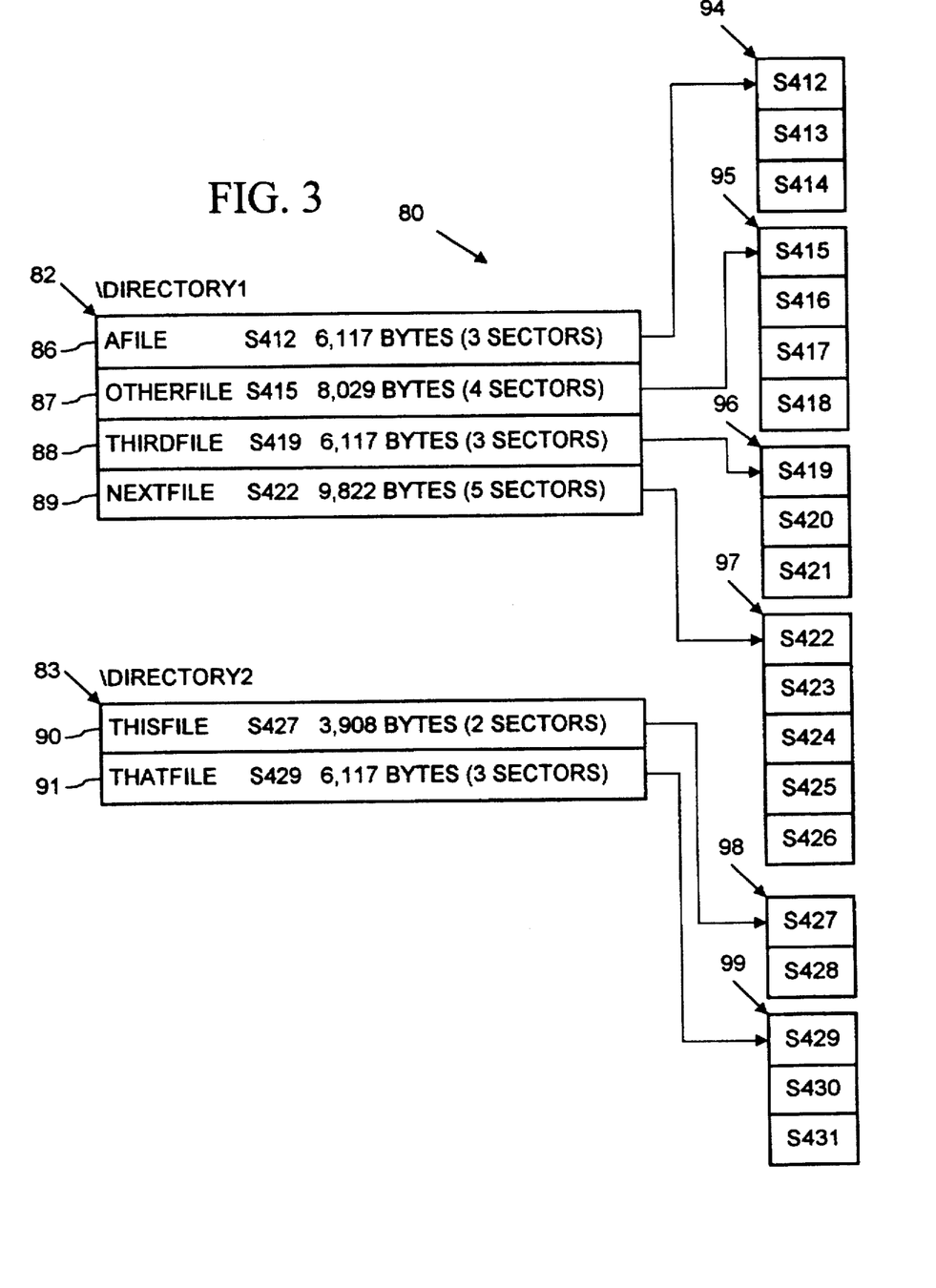
FIG. 3 is a block diagram of a data volume having a directory structure and a plurality of data streams.

Referring to FIG. 3, an example of a typical ISO-9660 compliant CD-ROM volume 80 has a hierarchical directory structure which comprises directories 82–83 (labeled "\DIRECTORY1" and "\DIRECTORY2" in FIG. 3) containing entries 86–91 for a set of related files. The CD-ROM volume 80 also has storage for a plurality of data streams 94–99 which constitute the files' "contents." In an ISO-9660 compliant CD-ROM volume, this storage is divided up into contiguous logical blocks called sectors (labeled S412-S431 in FIG. 3). Each file's data stream is stored as a sequence of one or more of these contiguous sectors. Each file's directory entry contains a file name, starting sector number, and length in bytes of the file, among other information. (The length in sectors of a file is determined from its length in bytes, and is not actually stored in the file's directory entry. Each file's length in sectors is indicated in FIG. 3 for convenience of illustration.) The file's starting sector number and length in bytes function as a pointer or reference to the file's data stream.

In typical ISO-9660 compliant CD-ROM volumes, such as the example CD-ROM volume 80, each file has its own unique data stream referenced by its directory entry (i.e., no two directory entries reference any one data stream). In CD-ROM volumes which contain duplicate files, this results in redundant storage of identical data streams. For example, in the CD-ROM volume 80, the files (named "AFILE," "THIRDFILE," and "THATFILE") with directory entries 86, 88, and 91 are duplicate files, meaning the data stream for each of these files is the same. The CD-ROM volume 80 stores these files as unique although identical data streams 94, 96, and 99.

Figure 4:
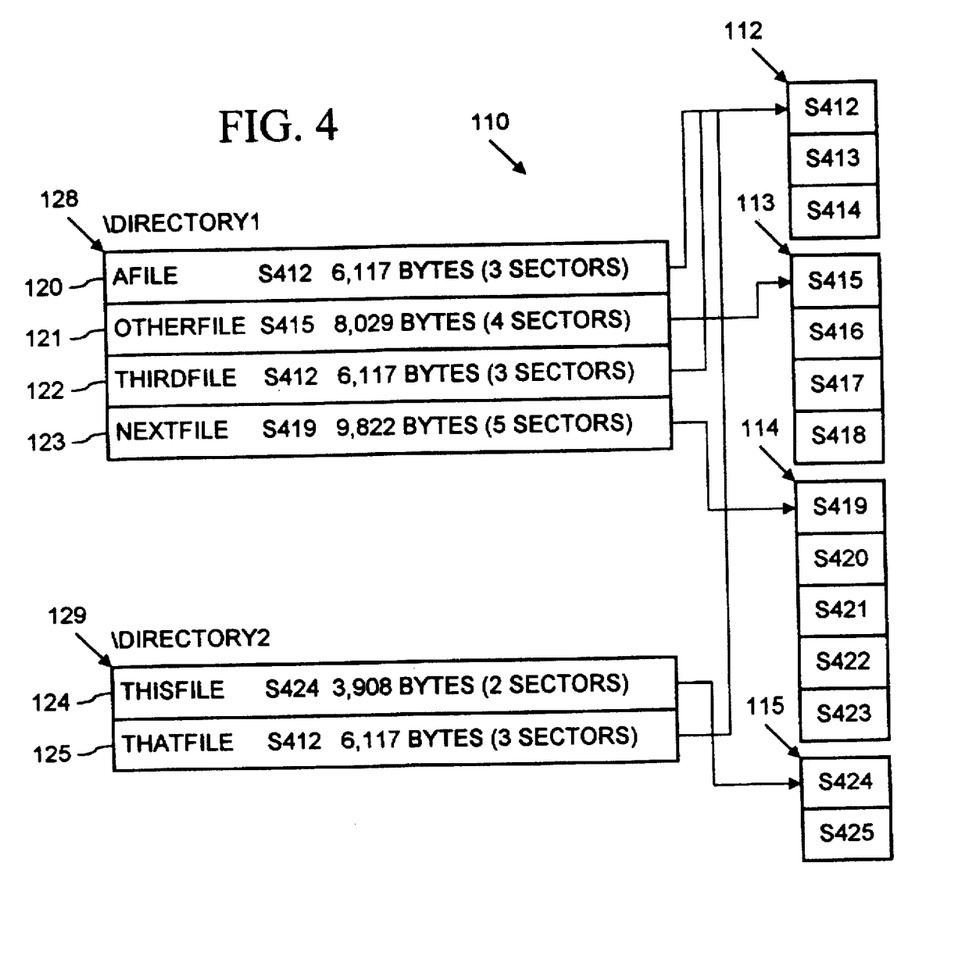
FIG. 4 is a block diagram showing the data volume of FIG. 3 encoded by the storage optimizing CD-ROM pre-mastering encoder of FIG. 2.

With reference to FIG. 4, the pre-mastering software application 50 (FIG. 2) optimizes the storage of the files in the CD-ROM volume 80 (FIG. 3) by detecting duplicate files and encoding the files in a storage optimized CD-ROM volume 110 with the directory entries of duplicate files pointing to a single data stream. More specifically, the storage optimizing encoder 56 (FIG. 2) detects that the data streams 94, 96, and 99 (FIG. 3) of the files, "AFILE," "THIRDFILE," and "THATFILE," are identical in the example CD-ROM volume 80. The storage optimizing encoder 56 then encodes a single data stream 112 for these duplicate files in the storage optimized CD-ROM volume 110. The non-duplicate files, "OTHERFILE," "NEXTFILE," and "THISFILE," are still encoded on the data volume 110 as unique data streams 113–115. The storage optimizing encoder 56 also encodes a hierarchical directory structure with entries 120–125 for the files in a "\DIRECTORY1" directory 128 and a "\DIRECTORY2" directory 129. The entries 120, 122 and 125 for the duplicate files are encoded with a starting sector number and length that points to the single data stream 112 for the duplicate files.

In some embodiments of the invention, the storage optimized CD-ROM volume 110 is encoded by removing the data streams 96, 99 of duplicate files which are detected to be identical to a previous data stream 94, and modifying the entries 88, 91 of these duplicate files to point to the previous identical data stream 94 in the CD-ROM volume 80. In other words, the original CD-ROM volume 80 (FIG. 3) is modified in the memory 26 of the computer system 20 (FIG. 1) by the storage optimizing encoder 56 (FIG. 2) to form the storage optimized data volume 110. In other embodiments of the invention, storage optimizing encoder 56 encodes the storage optimized CD-ROM volume 110 separate from the original CD-ROM volume 80 in the memory 26.

Figure 5:
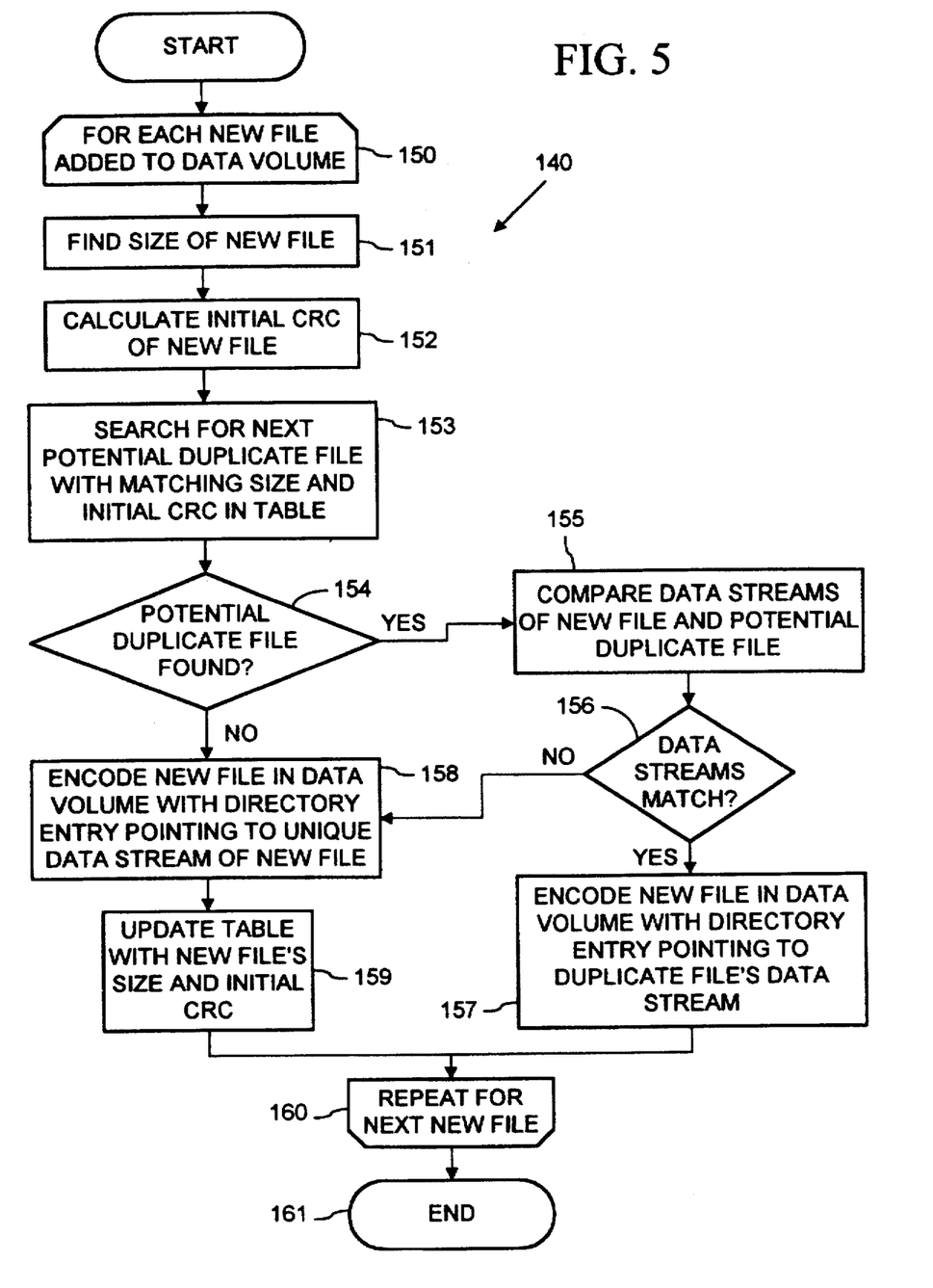
FIG. 5 is a flow diagram of a process performed in the CD-ROM pre-mastering encoder of FIG. 2 for encoding the data volume of FIG. 3 to optimize storage on a computer readable recording medium.
Figure 6:
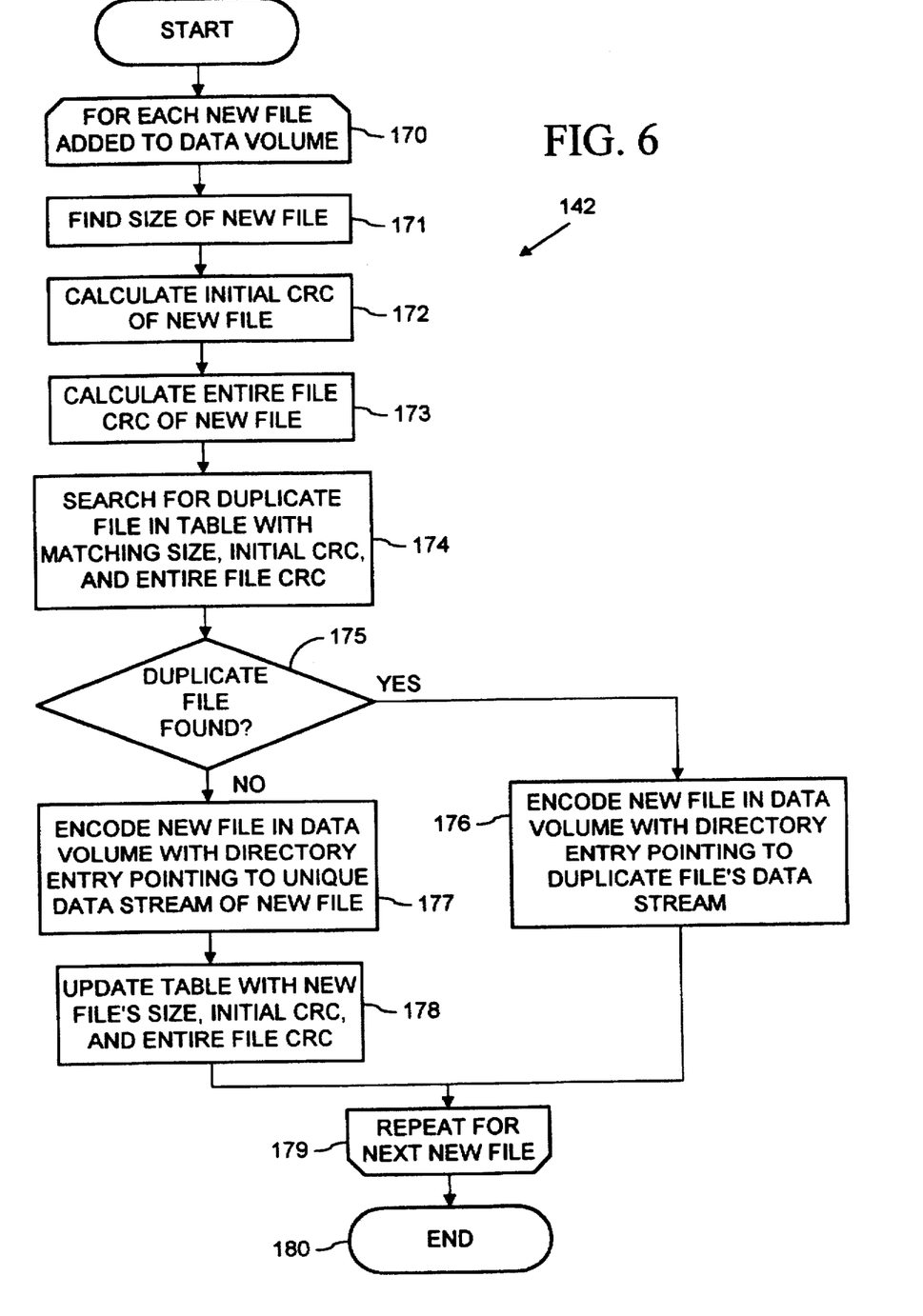
FIG. 6 is a flow diagram of an alternative process performed in the CD-ROM pre-mastering encoder of FIG. 2 for encoding the data volume of FIG. 3 to optimize storage on a computer readable recording medium.

With reference to FIGS. 5 and 6, the storage optimizing encoder 56 (FIG. 2) in the illustrated embodiment implements two separate processes by which duplicate files are detected and encoded as a single data stream. A process 140 shown in FIG. 5 (referred to herein as the slow, safe process) is slower, but utilizes the file comparator 64 FIG. 2) to ensure that potential duplicate files have identical data streams. A process 142 shown in FIG. 6 (referred to herein as the fast process) detects duplicate files with a high probability without utilizing the file comparator 64, and is generally quicker.

Referring now to FIGS. 2 and 5, the slow, safe process 140 comprises a "for" loop of steps 150–160 which is repeated for each file that is to be encoded by the pre-mastering software 50 (FIG. 2) into the storage optimized CD-ROM volume 110 (FIG. 4). The next file to be encoded on the CD-ROM volume 110 in each iteration of the for loop 150–160 is referred to as the "new file" for that iteration. The steps of the for loop 150–160 generally comprise two parts. A first or duplicate file detection part (comprising steps 151–156) detects whether the new file is a duplicate of any files already encoded on the CD-ROM volume 110. A second or file encoding part (comprising steps 157–160) encodes the new file on the CD-ROM volume 110 according to the result of the duplicate file detection.

In the duplicate file detection part 150–156 of the slow, safe process 140, the storage optimizing encoder 56 (FIG. 2) first identifies whether any file (referred to in FIG. 5 as the "potential duplicate file") already encoded on the storage optimized CD-ROM volume 110 is a potential duplicate of the new file based on their sizes and initial cyclic redundancy checks ("initial CRCs"). Two files which have the same size and initial CRC value are likely to be duplicates. Two files whose size and initial CRC value do not match, however, are guaranteed not to be identical. By searching for an already encoded file whose size and initial CRC value match those of the new file, the duplicate file detector 66 thus can more quickly identify whether any already encoded file is likely to be a duplicate of the new file.

More specifically, at a first step 151 of the for loop, the file size and CRC generator 60 (FIG. 2) finds the size in bytes of the new file. The size in bytes of the new file can be determined by querying a file system from which the new file originates (such as from reading the file size from the new file's directory entry in the CD-ROM volume 80 (FIG. 3) prior to storage optimized encoding according to the invention). Alternatively, the size of the new file can be determined by counting the number of bytes of the new file's data stream, or by calculating the difference in bytes between the byte addresses of the first and last bytes in the new file's data stream.

At a second step 152 of the for loop, the generator 60 calculates an initial CRC value of the new file. In the illustrated embodiment, the initial CRC value is a 32-bit cyclic redundancy check result calculated on the first 64 Kbytes of the new file (or the entire file if less than 64 Kbytes in size). A number of standard CRC calculations are known and can be used in the CRC generator 60 for initial and entire file CRC value calculation. In alternative embodiments of the invention, a hash value result calculated as a hash function of the data streams of the new file and potential duplicate file (or portion of the data streams) can be used in place of cyclic redundancy checks as the basis for duplicate file detection.

At a step 153 of the for loop, the duplicate file detector 66 (FIG. 2) searches for a file already encoded on the storage optimized CD-ROM volume 110 which has the same file size and initial CRC value as the new file. For this purpose, the storage optimizing encoder 56 maintains a file size/CRC value table 62 which lists the sizes and initial CRC values of the files encoded by the process 140 in previous iterations of the for loop 150–160. To speed this searching step, the table 62 in the illustrated embodiment is implemented as a b-tree. As indicated at step 154, the process 140 proceeds to step 155 on finding a first file in the table 62 having a matching size and initial CRC value. This file is likely to be a duplicate of the new file, and is the potential duplicate file referred to in FIG. 5. Otherwise, if the new file's size and initial CRC value do not match any in the table 62, the new file is a non-duplicate file and the process 140 proceeds to step 158 (where the new file is encoded as a non-duplicate file).

Then, at steps 155–156 in the duplicate file detection part of the process 140, the duplicate file detector 66 verifies that the new file and potential duplicate file actually are duplicates. By matching the size and initial CRC values of these files, the duplicate file detector 66 determines that these files are likely to be duplicates, but does not guarantee that they are. At step 155, the file comparator 64 compares the data streams of the new and potential duplicate files bit-for-bit to verify that their data streams are identical (which thus shows the files to be identical). As indicated at step 156, the process 40 proceeds to step 157 if the new file is shown to be an actual duplicate by this comparison. If the new file and potential duplicate files are not actually duplicates, the process 40 proceeds directly to step 158 (where the new file is encoded as a non-duplicate file) in the illustrated embodiment, even though another potential duplicate file (with matching size and initial CRC value) may be found in the table 62. Thus, if two files in the table 62 share the same unique size and initial CRC value, only the first of these encountered at the searching step 153 is considered as a potential duplicate file for the new file in the current iteration of the for loop. However, since two non-identical files rarely share the same size and initial CRC values, this only results in failure to detect a duplicate file in an extremely rare case. In alternative embodiments of the invention, the process 40 can instead return to step 153 and continue searching for another potential duplicate file to ensure duplicate file detection in this rare case as well.

Next, in the file encoding part of the process 140, the duplicate file removal encoder 68 encodes the new file according to the result of the duplicate file detection. At step 157, the duplicate file detector 66 has determined that the new file and the potential duplicate file are actual duplicates. The encoder 68 therefore encodes the new file on the storage optimized CD-ROM volume 110 with its directory entry pointing to the data stream of the previously encoded duplicate file. No new data stream is encoded on the storage optimized CD-ROM volume 110 for the new file.

At step 158, however, the duplicate file detector 66 has determined that the new file is a non-duplicate file. The encoder 68 therefore encodes the storage optimized CD-ROM volume 110 with a new data stream and a directory entry for the file which points to the new data stream. The new data stream will be uniquely referenced by the file's directory entry unless a file in a subsequent iteration of the process 140 is determined to have an identical data stream.

After encoding the new file as a unique file at step 158, the process 140 continues to step 159 where the duplicate file detector 66 updates the table 62 with the new file's size and initial CRC value. The duplicate file detector 66 thus can detect duplicates of the new file in subsequent iterations of the process 140.

On the other hand, in iterations of the process 140 where the new file is encoded as a duplicate file at step 157, the size and CRC value of the already encoded duplicate of the new file are already listed in the table 62. Accordingly, after encoding the new file as a duplicate at step 157, the table 62 is not updated with the new file's size and CRC value. Rather, the process 140 proceeds to step 160.

At step 160, the process 140 repeats for the next new file to be encoded in the CD-ROM volume 110. After all files are encoded by the process 140 on the CD-ROM volume 110, the process 140 ends 161.

Referring now to FIG. 6, in the fast process 142, the duplicate file detector 66 (FIG. 2) omits bit-for-bit comparison by the file comparator 64 (FIG. 2), and instead detects file duplication based only on file size, initial CRC value, and entire file CRC value. As in the slow, safe process 140 (FIG. 5), the fast process 142 also comprises a for loop of steps 170–179 with a duplicate file detection part and an encoding part. In the duplicate file detection part of the for loop, the process 142 again includes a step 171 in which the file size and CRC generator 60 (FIG. 2) finds the size of the new file, and a step 172 in which the generator 60 calculates an initial CRC value of the new file. At a step 172, the generator 60 additionally calculates CRC value (the "entire file CRC value") for the new file, which is not limited to an initial portion of the file. In the illustrated embodiment, the entire file CRC is a 32-bit CRC result calculated by a same standard technique as the initial CRC value.

In the storage optimizing encoder 56 (FIG. 2) utilizing the fast process 142, the duplicate file detector 66 maintains the sizes, and the initial and entire file CRC values of files previously encoded onto the CD-ROM volume 110 in the table 62 (FIG. 2). At step 174, the duplicate file detector 66 searches the table 62 for a previously encoded file on the CD-ROM volume 110 whose size, initial CRC value, and entire file CRC value match those of the new file. A new file and a previously encoded file which match in all three of these values are considered duplicates without performing a bit-for-bit comparison verification as in step 155 of the slow, safe process 140. As indicated at step 175, the process 142 then proceeds to step 176 (where the new file is encoded as a duplicate file) if the search succeeds, and to step 177 (where the new file is encoded as unique file) if no file is found which matches all three values. Although two files which match in all three values are not guaranteed to be actual duplicates, the rate of false duplicates detected is less than 1 in 4 billion for two files that are the same size. This extremely low failure rate is sufficient in many applications. The failure rate can be further reduced with longer CRC values. The fast process 142 thus saves time by not performing bit-for-bit comparison of the files at very low risk of data loss from encoding two non-identical files with a single one of the files' data streams.

At steps 176–177, the duplicate file removal encoder 68 encodes the file according to the result of the detection part as discussed above for steps 157–158 of the slow, safe process 140 (FIG. 5). After encoding the new file at step 177, the process 142 continues to step 178 where the duplicate file detector 66 updates the table 62 with the new file's size, initial CRC value, and entire file CRC value. At step 179, the process 142 then repeats for the next new file to be encoded in the CD-ROM volume 110. After all files are encoded by the process 142 on the CD-ROM volume 110, the process 142 ends 180.

Referring now to FIGS. 3–6, the slow, safe process 140 of FIG. 5 and the fast process 142 of FIG. 6 are further illustrated with reference to encoding of the example typical CD-ROM volume 80 (FIG. 3) into the storage optimized CD-ROM volume 110 (FIG. 4). When encoding with the slow, safe process 140, the first file, "AFILE," is encoded in a first iteration of the for loop 150–160. At steps 151–152, the file size and CRC generator 60 (FIG. 2) determines the size and initial CRC value of AFILE. At step 153, the duplicate file detector 66 searches the file size/CRC value table 62 for a previously encoded file having a matching size and initial CRC value. As AFILE is the first file to be encoded into the storage optimized CD-ROM volume 110, no potential duplicate file is found. Accordingly, the duplicate file encoder 68 encodes AFILE as a directory entry 120 and a single (and at this point unique) data stream 112 in the CD-ROM volume 110. The duplicate file detector 66 updates the table 62 with the size and CRC value of AFILE at step 159, completing the first iteration of the for loop 150–160.

In a next iteration of the for loop 150–160 in the process 140, the storage optimizing encoder 56 encodes the next file, "OTHERFILE," onto the CD-ROM volume 110. Again, the generator 60 determines the size and initial CRC value of OTHERFILE at steps 151–152. The duplicate file detector 66 then searches the table 62 for a potential duplicate file with matching size and initial CRC value. AFILE is the only previously encoded file, and its size and CRC value don't match those of OTHERFILE. Accordingly, the encoder 68 at steps 154, 158 encodes OTHERFILE as a directory entry 121 and a unique data stream 113. The detector then updates the table 62 with the size and initial CRC value of OTHERFILE at step 159, completing the second iteration of the for loop 150–160.

In a following iteration of the for loop 150–160, the file, "THIRDFILE," is encoded. At steps 151–152, the generator 60 determines the size and initial CRC value of THIRDFILE. The detector 66 then searches the table 62 for a potential duplicate file with matching size and initial CRC value, and finds that AFILE's size and initial CRC value are a match. The detector 66 then has the data streams of AFILE and THIRDFILE compared bit-for-bit to verify whether they are actual duplicates. In the illustrated example, these files are duplicates. So, the encoder 68 encodes THIRDFILE on the CD-ROM volume 110 as a directory entry 122 which points to the data stream 112 of AFILE. As shown at steps 156, 158, however, the encoder 68 will instead encode THIRDFILE as a directory entry and separate unique data stream if the comparison of step 155 indicates the files are not duplicates. THIRDFILE's size and initial CRC value are added to the table 62 at step 159, completing the third iteration of the for loop 150–160.

In subsequent iterations, the files, "NEXTFILE," "THISFILE," and "THATFILE," are encoded on the storage optimized CD-ROM volume 110. In their respective iterations, the generator 60 determines their size and initial CRC value at steps 151–152 and the detector 66 searches for a potential duplicate file with matching size and CRC value at step 153. As the size and CRC values of NEXTFILE and THISFILE do not match those of any of the previously encoded files, "AFILE," "OTHERFILE," and "THIRDFILE," the encoder 68 encodes NEXTFILE and THISFILE as directory entries 123–124 pointing to unique data streams 114–115. The size and initial CRC value of THATFILE, on the other hand, matches those of AFILE. Therefore, after the comparator 64 verifies that the data streams of THATFILE and AFILE are identical, the encoder 68 encodes THATFILE as a directory entry 125 also pointing to the data stream 112 of AFILE.

The fast process 142 similarly encodes the files into the storage optimized CD-ROM volume 110 in separate iterations of its for loop 170–179. The difference, as described above, is that the duplicate file detector 66 bases detection of a previously encoded duplicate file on file size, initial CRC value and entire file CRC value, and does not utilize the file comparator 64 to verify duplication.

With the storage optimizing encoder 56 and processes 140, 142, a storage savings of approximately 50 MB per volume on the Windows NT product CD-ROMs or around 15% of the total volume size was realized. This saved storage space can be used to encode more data, even making it possible to create CD-ROM volumes whose sum of file sizes exceeds the maximum capacity of a CD-ROM. The smaller volume size also can save time reproducing CD-ROMs (an inherently slow process). The amount of storage saved is related directly to the number and size of duplicate files in the volume, and thus a greater savings is achieved for CD-ROM volumes that contain a large number of duplicate files.

As discussed above, the illustrated embodiment of the invention is implemented in a CD-ROM pre-mastering software application. In alternative embodiments, however, the invention can be implemented in pre-mastering software applications for other computer readable recording media, including other optical media, magnetic media, and semiconductor media. For compatibility with typical operating system and application software products, the computer readable recording medium which is encoded by the invention preferably is a read-only medium. This avoids potential data consistency problems that could result when one of a plurality of duplicate files encoded as a single data stream is modified. In embodiments of the invention which are used in conjunction with an operating system or file system adapted to work with cross-linked files, however, the computer readable recording medium encoded by the invention can be both readable and writeable.

In addition to embodiments of the invention implemented in pre-mastering software applications, embodiments of the invention alternatively can be implemented in an operating system or file system software product to dynamically optimize storage in the memory system 26 of the computer 22 (FIG. 1). In such case, the encoder and process of the invention is applied at the time a file is created or saved on a data volume to detect whether the file is a duplicate of another existing file on the data volume. The encoder and process of the invention then encodes the file as a duplicate file cross-referenced to a single data stream on the data volume or a non-duplicate file with a unique data stream according to the result of the detection. This storage optimization can be done imperceptibly and without user interaction as part of normal file system operation. When an existing file is later modified (for read/write memory of the memory system 26), the operating system or file system software detects whether the file being modified is encoded as a duplicate file. In such case, the operating system or file system software can fork the data streams for the duplicate files into a new data stream for the modified file and the original single data stream for those of the duplicate files that are not modified.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of encoding data of a plurality of files in a data volume to optimize storage of the data volume on a computer readable recording medium, each file containing one whole file data stream, the method comprising the steps of:

detecting whether any at least two separately identified files of the data volume contain whole file data streams that are identical; and encoding the files for storing on the computer readable recording medium according to an encoding scheme in which said files containing identical whole file data streams are encoded as a single data stream.

2. The method of claim 1 further comprising the step of: encoding the files for storing on the computer readable recording medium according to the encoding scheme in a directory structure in which entries for said separately identified files containing identical whole file data streams each reference the single data stream.

3. The method of claim 1 wherein the step of detecting comprises the steps of: determining a size of the whole file data stream of each file; calculating a result value as a function of at least a portion of the whole file data stream of each file; and searching for at least two of the files that have a same size and result value.

4. The method of claim 3 wherein the result value is a cyclic redundancy check result.

5. The method of claim 3 wherein the step of detecting further comprises the step of:

verifying that the whole file data streams of said files that have a same size and result value are identical.

6. The method of claim 5 wherein the step of verifying comprises the step of:

performing a bit-for-bit comparison of the whole file data streams of said files that have a same size and result value.

7. A method of encoding data of a plurality of files to optimize storage of the data in a data volume on a computer readable recording medium, each file containing one whole file data stream, the method comprising the steps of;

detecting whether any at least two of the files contain whole file data streams that are identical; and encoding the files for storing on the computer readable recording medium according to an encoding scheme in which said files containing identical whole file data streams are encoded as a single data stream;

wherein the step of detecting comprises the steps of:

determining a size of the whole file data stream of each file; calculating a first result value as a function of an initial portion of the whole file data stream of each file;

calculating a second result value as a function of the entire whole file data stream of each file; and searching for at least two of the files that have a same size and first and second result values.

8. A method of optimizing the storage of a data volume containing whole file data streams of a plurality of files and a directory structure with entries for the files, each file containing one whole file data stream, comprising the steps of:

detecting whether the whole file data streams of any two of the files are identical;

for two files detected as having identical whole file data streams, performing the steps of:

removing one of the identical whole file data streams; and encoding the directory entries of the two files to reference the remaining one of the identical whole file data streams.

9. The method of claim 8 wherein the step of detecting comprises the steps of:

determining a size of the whole file data stream of each file;

calculating a result value as a function of at least a portion of the whole file data stream of each file; and searching for two of the files that have a same size and result value.

10. The method of claim 9 wherein the result value is a cyclic redundancy check result.

11. The method of claim 9 wherein the step of detecting further comprises the step of:

verifying that the whole file data streams of said files that have a same size and result value are identical.

12. The method of claim 11 wherein the step of verifying comprises the step of:

performing a bit-for-bit comparison of the whole file data streams of said files that have a same size and result value.

13. A method of optimizing the storage of a data volume containing whole file data streams of a plurality of files and a directory structure with entries for the files, each file containing one whole file data stream, comprising the steps of:

detecting whether the whole file data streams of any two of the files are identical;

for two files detected as having identical whole file data streams, performing the steps of:
   (a) removing one of the identical whole file data streams; and
   (b) encoding the directory entries of the two files to reference the remaining one of the identical whole file data streams;

wherein the step of detecting comprises the steps of:

determining a size of the whole file data stream of each file;

calculating a first result value as a function of an initial portion of the whole file data stream of each file;

calculating a second result value as a function of the entire whole file data stream of each file; and searching for at least two of the files that have a same size and first and second result values.

14. A computer readable recording medium containing a data volume encoded by a process for optimizing data storage of a plurality of files, each file containing one whole file data stream, the process comprising the steps of:
   detecting whether any at least two separately identified files of the data volume contain whole file data streams that are identical; and
   encoding the files in the data volume according to an encoding scheme in which said files containing identical whole file data streams are encoded as a single data stream.

15. The computer readable recording medium of claim 14 wherein the process further comprises the step of:
   encoding the files for storing in the data volume according to the encoding scheme in a directory structure in which entries for said separately identified files containing identical whole file data streams each reference the single data stream.

16. The computer readable recording medium of claim 14 wherein the step of detecting comprises the steps of:
   determining a size of the whole file data stream of each file;
   calculating a result value as a function of at least a portion of the whole file data stream of each file; and
   searching for at least two of the files that have a same size and result value.

17. The computer readable recording medium of claim 16 wherein the result value is a cyclic redundancy check result.

18. The computer readable recording medium of claim 16 wherein the step of detecting further comprises the step of:
   verifying that the whole file data streams of said files that have a same size and result value are identical.

19. The computer readable recording medium of claim 18 wherein the step of verifying comprises the step of:
   performing a bit-for-bit comparison of the whole file data streams of said files that have a same size and result value.

20. A computer readable recording medium containing a data volume encoded by a process for optimizing data storage of a plurality of files, each file containing one whole file data stream, the process comprising the steps of:
   detecting whether any at least two of the files contain whole file data streams that are identical; and
   encoding the files in the data volume according to an encoding scheme in which said files containing identical whole file data streams are encoded as a single data stream;
   wherein the step of detecting comprises the steps of:
      determining a size of the whole file data stream of each file;
      calculating a first result value as a function of an initial portion of the whole file data stream of each file;
      calculating a second result value as a function of the entire whole file data stream of each file; and
      searching for at least two of the files that have a same size and first and second result values.

21. The computer readable recording medium of claim 14 wherein the data volume is read only.

22. An encoder for optimizing storage of a plurality of files in a data volume on a computer readable recording medium, each file containing one whole file data stream, the encoder comprising:
   a detector for detecting whether any at least two separately identified files of the data volume contain whole file data streams that are identical;
   means responsive to detection of at least two files containing identical whole file data streams for encoding said two files as a single data stream in the data volume.

23. The encoder of claim 22 further comprising:
   means responsive to detection of at least two files containing identical whole file data streams for encoding a directory structure in the data volume in which entries for said files containing identical whole file data streams each reference the single data stream.

24. The encoder of claim 23 which is a pre-mastering software application.

25. The encoder of claim 23 which is a computer operating system.

26. The encoder of claim 23 which is a computer file system.

27. The encoder of claim 23 further comprising:
   a file size generator for determining a file size of each of the files;
   a result value generator for calculating a result value of each of the files as a function of at least a portion of the file's whole file data stream; and
   means for searching the files to find at least two files that have a same size and result value.

28. The encoder of claim 27 further comprising:
   a comparator for verifying that two files having a same size and result value have identical whole file data streams.

29. The encoder of claim 27 wherein the result value generator generates a cyclic redundancy check.

30. In a pre-mastering software application on a computer, a method of optimizing storage of a plurality of files in a data volume on a master recording medium, each file having data stream contents, the method comprising:
   adding files one-by-one to the data volume;
   for each file added to the data volume,
      calculating a check value as a function of an initial portion of the currently added file's data stream contents;
      determining a size of the currently added file's data stream contents;
      searching in a table of the check value and size of each of the files previously added to the data volume for a potential duplicate file having a matching check value and size;
      if a potential duplicate file is found, verifying via a bit-for-bit comparison that the currently added file is identical to the potential duplicate file;
      if the currently added file is verified to be identical, encoding the currently added file in the data volume as a directory entry that separately identifies the currently added file from the identical file and points to a same data stream contents as a directory entry of the identical file; and
      if not verified to be identical to any file previously added to the data volume, then (a) updating the table with the currently added file's check value and size, and (b) encoding the data stream contents of the currently added file and a directory entry that separately identifies the currently added file from previously added files and points to the encoded data stream contents of the currently added file in the data volume.

31. In a pre-mastering software application on a computer, a method of optimizing storage of a plurality of files in a data volume on a master recording medium, each file having data stream contents, the method comprising:

adding files one-by-one to the data volume;

for each file added to the data volume, calculating a first check value as a function of an initial portion of the currently added file's data stream contents;

calculating a second check value as a function of an entirety of the currently added file's data stream contents;

determining a size of the currently added file's data stream contents;

searching in a table of the first and second check values and size of each of the files previously added to the data volume for a duplicate file having first and second check values and size matching those of the currently added file;

if such duplicate file is found, encoding the currently added file in the data volume as a directory entry that separately identifies the currently added file from the duplicate file and points to a same data stream contents as a directory entry of the duplicate file; and if no duplicate file is found, then (a) updating the table with the currently added file's check value and size, and (b) encoding the data stream contents of the currently added file and a directory entry that separately identifies the currently added file from previously added files and points to the encoded data stream contents of the currently added file in the data volume.

* * * * *